(12) United States Patent
Matsubara et al.

(10) Patent No.: US 6,869,730 B2
(45) Date of Patent: Mar. 22, 2005

(54) ELECTRODE MATERIAL, METHOD FOR PREPARING SAME, ELECTRODE, AND BATTERY COMPRISING SAME

(75) Inventors: Keiko Matsubara, Yokohama (JP); Toshiaki Tsuno, Yokohama (JP); Akira Takamuku, Yokohama (JP); Kyou-Yoon Sheem, Cheonan (KR)

(73) Assignee: Samsung SDI Co., Ltd., Suwon (KR)

(*) Notice: Subject to any disclaimer, the term of this patent is extended or adjusted under 35 U.S.C. 154(b) by 255 days.

(21) Appl. No.: 10/251,671

(22) Filed: Sep. 20, 2002

(65) Prior Publication Data

US 2003/0091899 A1 May 15, 2003

(30) Foreign Application Priority Data

Sep. 26, 2001 (JP) .......................................... 2001-294816
Sep. 26, 2001 (JP) .......................................... 2001-294817

(51) Int. Cl.$^7$ ............................................... H01M 4/62
(52) U.S. Cl. .......................................................... 429/217
(58) Field of Search ................................. 429/213, 217

(56) References Cited

U.S. PATENT DOCUMENTS 5,686,203 A * 11/1997 Idota et al. ................. 429/342

FOREIGN PATENT DOCUMENTS

| JP | 02-100265 | * | 4/1990 |
| JP | 10-219739 | | 8/1998 |
| JP | 2000-219739 | | 8/2000 |

* cited by examiner

*Primary Examiner*—Patrick Ryan
*Assistant Examiner*—Thomas H. Parsons
(74) *Attorney, Agent, or Firm*—Christie, Parker and Hale, LLP

(57) ABSTRACT

Disclosed are an electrode material, a method for its preparation, an electrode comprising the electrode material and a battery comprising the same. The electrode material comprises a binder comprising a water-soluble conductive polymer and a water-soluble polymer, and an active material.

13 Claims, 1 Drawing Sheet

ELECTRODE MATERIAL, METHOD FOR PREPARING SAME, ELECTRODE, AND BATTERY COMPRISING SAME

CROSS REFERENCE TO RELATED APPLICATION

This application claims priority of Japanese patent application No. 2001-294816 filed in the Japanese Patent Office on Sep. 26, 2001, and Japanese patent application No. 2001-294817 filed in the Japanese Patent Office on Sep. 26, 2001, the disclosures of which are incorporated herein by reference.

BACKGROUND OF THE INVENTION (a) Field of the Invention

The present invention relates to an electrode material, a method for its preparation, an electrode, and a battery comprising the electrode, and more particularly, to an electrode material having a strong binding strength among active materials or between an active material and a collector, having flexibility, a higher charge-discharge capacity, and enhanced cycle life characteristics, a method for its preparation, an electrode, and a battery comprising the same.

(b) Description of the Related Art

The use of portable electronic instruments is increasing as electronic equipment gets smaller and lighter due to developments in high-tech electronic industries. Studies on lithium secondary batteries are actively being pursued in accordance with the increased need for a battery having high energy density for use as a power source in these portable electronic instruments.

Because the capacity of a battery is proportional to the amount of the active material, it is important to fill as much active material as possible in the electrode plate by eliminating materials other than active materials, in order to obtain a lithium secondary battery having a high energy density as well as to increase a capacity per unit weight of the active material.

Polyvinylidene fluoride (PVdF), which is currently commonly used as a negative electrode binder, is soluble in an organic solvent such as N-methyl-2-pyrrolidone. Although PVdF is not specially used as a binder, it is found that it provides a binding strength to an electrode by adding 8 to 10 wt % based on the carbon amount, and in addition, it is compatible with graphite materials.

However, PVdF can coat the active materials even in the state that fibers are fully bound, so that capacity, efficiency, and other inherent battery properties of an active material are not optimized. For the complete intercalation/deintercalation of lithium ions into an active material, electrode impedance should be drastically reduced, but a common binder is non-conductive. Therefore, it is necessary to reduce the amount of binder added as well as to increase the conductivity of the binder. It is suggested to incorporate a conductive polymer into a binder to obtain excellent battery properties, which is not accomplished with the conventional methods.

The PVdF has strong binding strength, but low flexibility. The low flexibility of PVdF can easily deteriorate cycle life characteristics of a lithium secondary battery due to breaking of the bond between active materials when the active material is a carbon material such as a natural graphite having a small surface pitch and a consequently high ratio of expansion to contraction during charging and discharging. Therefore, in order to absorb the expansion and contraction stresses of the active material during charging and discharging, it has been suggested to adopt a binder having elasticity.

With respect to safety, a binder such as PVdF, which is soluble in an organic solvent, is harmful to humans and the environment, and the organic solvent should be recovered. Therefore, it is advantageous to use an aqueous binder that is environmentally friendly and does not need to be recovered.

An exemplary aqueous binder for a lithium secondary battery is latex such as styrene-butadiene rubber (SBR). SBR has a high elasticity, and it is expected to help an electrode relieve expansion and contraction during charging and discharging, when the SBR is used for a binder with a thickener such as cellulose. However, since the latex binder is adhesive, it has a smaller surface area in contact with an active material compared to polyvinylidene fluoride. Therefore, the active material may be easily separated from the electrode due to weakening of binding strength between active materials, and the cycle life characteristics of a battery comprising the electrode may deteriorate compared to those of a battery comprising the PVdF binder.

In particular, artificial graphite has a small specific surface area and bad wettability. Therefore, when a binder with only latex and a thickener is applied to the artificial graphite, the active material can easily separate from the electrode during hundreds of repeated charge and discharge cycles.

SUMMARY OF THE INVENTION

In one embodiment, the present invention provides an electrode material comprising a binder comprising a water-soluble conductive polymer and a water-soluble polymer, and an active material.

In another embodiment, the present invention provides a method for preparing the electrode material comprising the steps of mixing a binder comprising a water-soluble conductive polymer and a water-soluble polymer, an active material, and water, and drying the mixture.

The present invention further provides an electrode comprising the electrode material.

The present invention further provides a lithium secondary battery including the electrode.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE INVENTION

Figure 1:
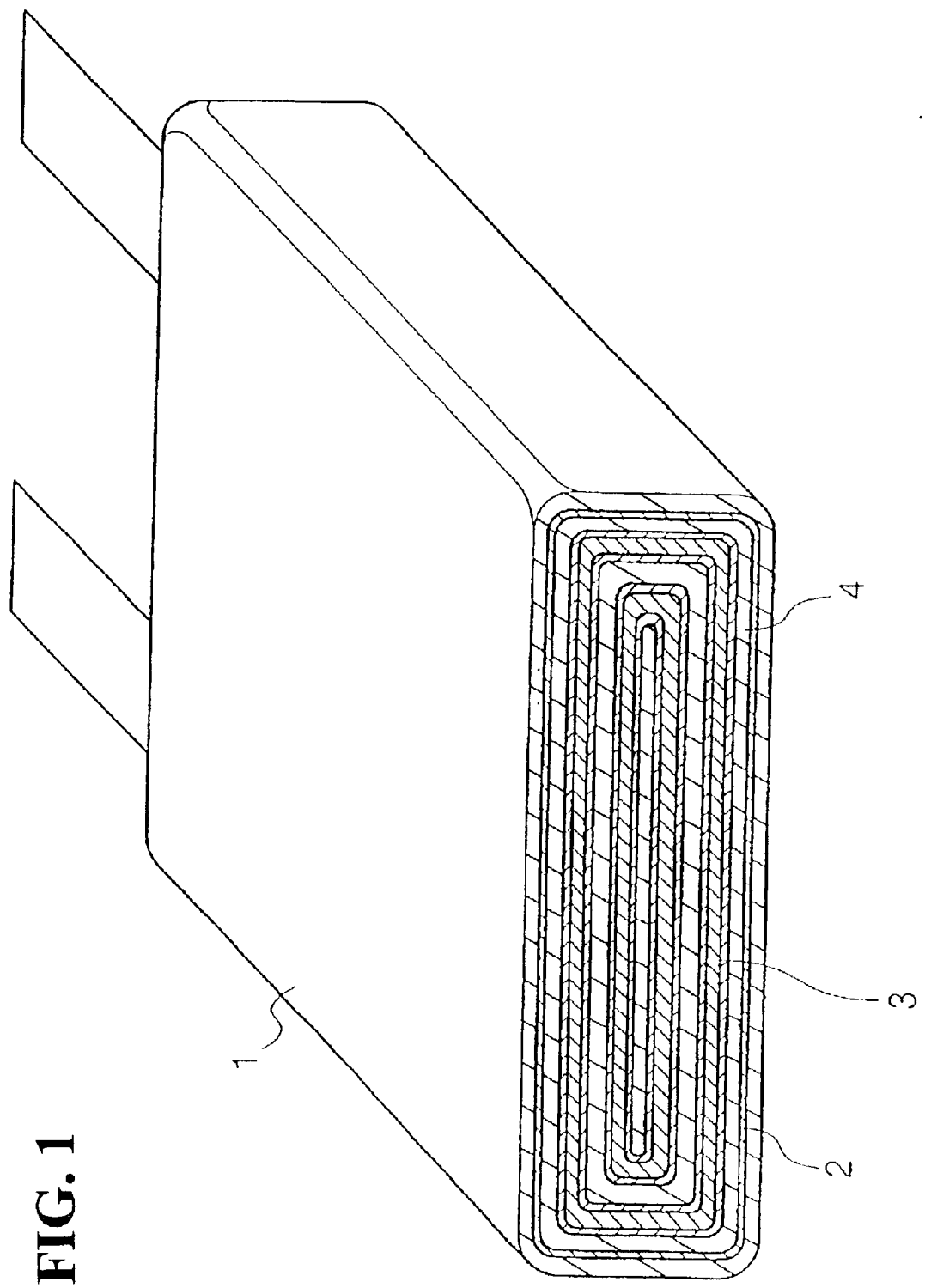
FIG. 1 is a perspective view showing a battery according to the invention.

In the following detailed description, only a preferred embodiment of the invention has been shown and described, simply by way of illustration of the best mode contemplated by the inventors of carrying out the invention. As will be realized, the invention is capable of modification in various obvious respects, all without departing from the invention. Accordingly, the description is to be regarded as illustrative in nature, and not restrictive.

To prepare a battery having a high charge and discharge capacity, enhanced cycle life characteristics, and flexibility, the electrode material of the present invention comprises a binder comprising a water-soluble conductive polymer and a water-soluble polymer, and an active material.

The binder of the present invention comprises both the water-soluble conductive polymer and the water-soluble polymer. It may further comprise latex.

The electrode material of the present invention is prepared by adhering the binder to an active material.

The water-soluble conductive polymer preferably includes water-soluble aniline-based polymers. Preferred water-soluble aniline-based polymers include polyaniline sulfonic acid and polyaniline carbonic acid, and more preferably polyaniline sulfonic acid. Polyaniline sulfonic acid has a high reactivity with carbon materials that are generally used for a negative material of a lithium secondary battery, and it easily adheres to carbon materials.

Hereinafter, a water-soluble aniline-based polymer will be described as an exemplary water-soluble conductive polymer, in detail.

The water-soluble aniline-based polymer includes polyaniline, which is a conductive polymer. When the polyaniline is used for a binder, an electrode comprising the binder shows a lower electrode impedance than electrodes comprising conventional binder polymers. A method for preparing a water-soluble conductive polymer including polyaniline is disclosed in Japanese Patent Laid-open No. JP 2000-219739, the disclosure of which is incorporated herein by reference.

Because a binder comprising only a water-soluble conductive aniline-based polymer and an active material has insufficient binding strength, the binder according to the present invention further comprises a water-soluble polymer in addition to the water-soluble conductive aniline-based polymer and an active material. The obtained inventive binder has a high binding strength between active materials and between an active material and a collector, and provides sufficient viscosity and coating properties to prepare a uniform electrode.

To prepare an electrode having improved flexibility and cycle life characteristics, the binder may further comprise latex in addition to the water-soluble aniline-based polymer and water-soluble polymer. Also, it is possible to provide sufficient binding strength by using a smaller amount of the inventive binder compared to conventional binders. The content of the active materials is thereby increased, and a lithium secondary battery having high capacity can be prepared.

It is preferred that the content of water-soluble aniline-based polymer ranges from 0.1 to 10 wt % based on the total weight of the electrode material, and it more preferably ranges from 0.3 to 2 wt %. When the content of the water-soluble aniline-based polymer is below 0.1 wt %, the binding strength between active materials can decrease. When the content of the water-soluble aniline-based polymer is greater than 10 wt %, the cycle life characteristics of a battery at high rates may deteriorate due to a decrease in battery capacity and an increase in battery impedance. In addition, a collector coated with a sluny that is prepared from a binder, active materials, and water is not preferred because the collector may be insufficiently coated with the slurry.

A water-soluble polymer such as cellulose is currently being used for a thickener. In the present invention, the water-soluble binder is added to one or more water-soluble aniline-based polymers and acts as a thickener and a binder to increase the binding strength between active materials or between one or more active materials and a collector.

Preferably latex is also added to the water-soluble aniline-based polymer and the water-soluble polymer in order to increase the flexibility of the electrode.

Exemplary water-soluble polymers of the present invention include polyvinyl alcohol, carboxymethyl cellulose, polyvinylpyrrolidone, polyacrylic acid, polymethacrylic acid, polyethylene oxide, polyacryl amide, poly-N-isopropylacrylamide, poly-N,N-dimethylacrylamide, polyethylene imine, polyoxyethylene, poly(2-methoxyethoxyethylene), poly(3-morphinylethylene), polyvinylsulfonic acid, polyvinylidene fluoride, and amylose, and preferably polyvinyl alcohol. A polyvinyl alcohol can be suitably used to fabricate a battery having a high charge and discharge capacity and enhanced cycle life characteristics since it is stable during repeated charge and discharge without causing deterioration of the battery or deposition.

The content of the water-soluble polymer preferably ranges from 0.1 to 10 wt % based on the weight of the electrode material of the present invention, and more preferably it ranges from 0.3 to 3 wt%. When the content of the water-soluble polymer is less than 0.1 wt %, the viscosity of a slurry composed of a binder, active materials, and water decreases substantially, so that it is difficult to prepare a uniform electrode, and the binding strength between active materials or between an active material and a collector decreases. When the content of the water-soluble polymer is greater than 10 wt %, the viscosity of the slurry increases substantially so that the collector is insufficiently coated with the slurry and the battery flexibility deteriorates. In addition, the battery capacity deteriorates due to the decrease in active material.

The latex used in the present invention preferably comprises styrene-butadiene rubber, nitrile butadiene rubber, methylmethacrylate butadiene rubber, or chloroprene rubber, and more preferably comprises styrene-butadiene rubber. It is preferred to add the latex to the electrode material to provide an electrode with high flexibility and to prepare a battery having improved cycle life characteristics.

The content of latex preferably ranges from 0.1 to 10 wt %. When the latex content is less than 0.1 wt %, the electrode flexibility deteriorates. When the latex content is greater than 10 wt %, the electrode becomes rigid, and the battery capacity deteriorates due to an increase in the total weight of the binder.

The total content of water-soluble aniline-based polymer and water-soluble polymer is preferably 10 wt % or less based on the total weight of the electrode material of the present invention, and more preferably it is 5 wt % or less. When the total content is greater than 10 wt %, the electrode impedance can increase, the battery capacity can decrease, and the electrode flexibility can deteriorate.

The total content of water-soluble aniline-based polymer, water-soluble polymer, and latex is preferably 20 wt % or less, and it is more preferably 5 wt % or less. When the total content of water-soluble aniline-based polymer, water-soluble polymer and latex is greater than 20 wt %, the electrode impedance can increase, the battery capacity can decrease, and the electrode flexibility can deteriorate.

Negative active materials that are capable of being applied with the binder according to the present invention include natural graphite, artificial graphite, expanded graphite, carbon fibers, and hard carbons such as heat-treated phenol resins; carbon blacks such as acetylene black and ketjen black; carbon materials such as carbon nanotubes, fullerene, and active carbon; metals that are capable of alloying with Li, such as Al, Si, Sn, Ag, Bi, Mg, Zn, In, Ge, Pb, Pd, Pt, and Ti; a compound comprising the aforementioned metal elements; a composite of carbon and graphite materials, and a nitride comprising lithium. The positive active material is also capable of being applied with a binder of the positive active material.

The binder of the present invention has a strong binding strength, such that only about half as much of the amount of the conventional binder needs to be used in order to achieve the same binding performance. Therefore, the amount of active material to be filled into the battery can be increased by as much as the binder amount is reduced, and thereby battery capacity can be enhanced.

According to the present invention, it is possible for the binder to absorb the expansion and the contraction of the active material during the repeated charge and discharge since its flexibility is increased by adding latex to the binder, so that a battery having improved cycle life characteristics can be fabricated.

Also, since the binder of the present invention is aqueous, it can be used safely, and its solvent does not need to be recovered.

The electrode material of the present invention may further comprise a conductive agent such as carbon black or a vapor grown carbon fiber, and it may further comprise other components such as a metal, a metal compound, and/or a metallic oxide to enhance battery performance.

A method for preparing the electrode material of the present invention includes the steps of mixing a binder comprising a water-soluble conductive polymer, a water-soluble polymer, and an active material with water to prepare a slurry paste, and drying the slurry paste. When the slurry paste is prepared, latex may be further added to the binder.

The water-soluble conductive polymer preferably includes a water-soluble aniline-based polymer. The water-soluble aniline-based polymer preferably includes polyaniline sulfonic acid and polyaniline carbonic acid, and more preferably it includes polyaniline sulfonic acid. Polyaniline sulfonic acid is highly reactive with carbon materials that are generally used for negative materials for lithium secondary batteries, and thereby it provides a high binding strength.

Hereinafter, the water-soluble aniline-based polymer will be described as an exemplary water-soluble conductive polymer.

The slurry prepared by mixing an electrode material and water is coated on a collector of a metal foil or a metal net to prepare a negative electrode.

When the water-soluble polymer for the binder is polyvinyl alcohol, the paste is preferably dried at 150° C. or less. When the drying temperature of the slurry is greater than 150° C., the polyvinyl alcohol can decompose, and electrode resistance derived from the water-soluble aniline-based polymer can increase.

The binder and electrode according to the present invention have flexibility because the binder of the present invention further comprises latex, and thereby it is possible to provide a battery having improved cycle life characteristics.

According to the present invention, the binder can exert enough binding strength in an amount equal to half that of the conventional binder. Further, the binder has flexibility enough to absorb the expansion and contraction of the active material. Because the binder comprises the water-soluble conductive polyaniline, it facilitates the intercalation and deintercalation of lithium ions to prevent the deterioration of cycle life characteristics during repeated charge and discharge at a high rate. It is thereby possible to provide an electrode material having high charge and discharge capacity and improved cycle life characteristics. Also, since the binder of the present invention is aqueous, it can be used safely, and its solvent does not need to be recovered.

In order to prepare a negative electrode, a collector is coated with the electrode material, and then the coated collector is dried. The negative electrode can be attached to a negative tube or a bottom of a negative terminal, but other arrangements are included within the invention.

The electrode of the present invention includes at least one of the aforementioned electrode materials. The electrode has a high energy density and excellent cycle life characteristics. Preferably the electrode is applied to a negative electrode to prepare a battery having good cycle life characteristics.

A battery of the present invention comprises the negative electrode, a positive electrode that is capable of reversibly intercalating/deintercalating lithium ions, and an organic electrolyte. The positive electrode may comprise the electrode material of the present invention. The electrode comprising the electrode material of the present invention has high energy density and enhanced cycle life characteristics. It can be applied to various kinds of batteries such as a lithium secondary battery or a nickel-hydrogen battery, and it can be preferably applied to a lithium secondary battery.

A positive electrode of the present invention includes an electrode material that is capable of reversibly intercalating/deintercalating lithium ions, such as $LiMnO_2$, $LiCoO_2$, $LiNiO_2$, $LiFeO_2$, $V_2O_5$, TiS, and MoS, and an electrode comprising positive electrode materials such as an organic disulfide compound or an organic polysulfide compound.

The positive electrode is attached to a positive tube or a bottom of a positive terminal, but other arrangements are included within this invention.

An exemplary organic electrolyte is an organic electrolyte that is prepared by dissolving a lithium salt in an aprotic solvent.

Examples of aprotic solvents include propylene carbonate (PC), ethylene carbonate (EC), butylene carbonate (BC), benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate (DMC), methylethylcarbonate, diethylcarbonate, methylpropylcarbonate, methylisopropylcarbonate, ethylbutylcarbonate, dipropylcarbonate, diisopropylcarbonate, dibutylcarbonate, diethyleneglycol, dimethylether, and mixtures thereof. It is preferred that the electrolyte comprises at least one carbonate selected from the group consisting of propylene carbonate (PC), ethylene carbonate (EC), and butylene carbonate (BC), and at the same time also comprises at least one carbonate selected from the group consisting of dimethylcarbonate (DC), methylethylcarbonate (MEC), and diethylcarbonate (DEC).

The lithium salt is preferably selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, LiI and mixtures thereof. Preferably, it includes $LiPF_6$ or $LiBF_4$.

Additionally, a conventional organic electrolyte for a lithium secondary battery is also used.

Also, a polymer electrolyte may be used for an organic electrolyte, e.g. a mixture of a polymer such as polyethylene oxide and polyvinyl alcohol with one of the aforementioned lithium salts, and a polymer with a high swelling degree that is incorporated in an organic electrolyte.

A lithium secondary battery is fabricated by preparing the electrode groups by coating the active material to a suitable thickness and length on a collector of a thin plate or coating the active material itself in the form of a film, placing the electrode groups into a can or similar container, and then injecting organic electrolyte into the can or container. Subsequently, the coated material or film is rolled up or laminated along with a porous insulating separator. Resin film such as polyethylene, polypropylene, etc. can be used as the separator.

The lithium secondary battery of the present invention may be fabricated in various shapes such as a cylinder, prism, coin, or sheet. The shape of the lithium secondary battery is not limited to those mentioned, and it may be shaped in forms other than the aforementioned. As shown generally in FIG. 1, the positive electrode 3 and negative electrode 4 along with the separator 2 are put into a case 1 with an electrolyte to fabricate a lithium secondary cell.

The following Examples further illustrate the present invention in detail, but they are not to be construed to limit the scope thereof.

EXAMPLES AND COMPARATIVE EXAMPLES

Example 1

96 wt % of natural graphite, 2 wt % of polyvinyl alcohol (PVA), and 2 wt % of polyaniline sulfonic acid (manufactured by Mitsubishi Co. and called aquaPASS, hereinafter referring to as PASS) were mixed together with water and stirred for 15 minutes to prepare a slurry paste for a negative mass, and the slurry paste was coated on a copper foil. The negative mass-coated foil was pre-dried at 60° C. for 30 minutes, and it was further dried under vacuum at 120° C. for 24 hours. The material was thereby laminated with a thickness of 100 μm on the copper foil. The laminated copper foil was cut in a coin-shape with a diameter of 13 mm, and pressed with a pressure of 1 ton/cm$^2$ to prepare a negative electrode. Porous polypropylene film was used for a separator, and it was interposed between the working electrode and the counter lithium electrode. The electrolyte was prepared with 1 mol/l of LiPF$_6$ in a mixture of dimethyl carbonate (DMC), diethyl carbonate (DEC), and ethylene carbonate (EC). The working and counter electrodes and the separator were put into a coin-type case with an electrolyte to fabricate a lithium secondary coin-cell.

Example 2

A lithium secondary coin-cell was prepared in the same manner as in Example 1, except that 98 wt % of natural graphite, 1 wt % of PVA and 1 wt % of PASS were mixed with water to prepare a slurry for a negative mass.

Example 3

A lithium secondary coin-cell was prepared in the same manner as in Example 1, except that 94 wt % of natural graphite, 3 wt % of PVA and 3 wt % of PASS were mixed with water to prepare a slurry for a negative mass.

Example 4

A lithium secondary coin-cell was prepared in the same manner as in Example 1, except that a Cu foil was pre-dried at 150° C. for 30 minutes, and it was further dried under vacuum at 120° C. for 24 hours.

Example 5

A lithium secondary coin-cell was prepared in the same manner as in Example 1, except that a Cu foil was pre-dried at 180° C. for 30 minutes, and it was further dried under vacuum at 120° C. for 24 hours.

Example 6

A lithium secondary coin-cell was prepared in the same manner as in Example 1, except that 96 wt % of natural graphite, 2 wt % of carboxymethyl cellulose (CMC) and 2 wt % of PASS were mixed with water to prepare a slurry for a negative mass.

Comparative Example 1

A lithium secondary coin-cell was prepared in the same manner as in Example 1, except that 90 wt % of natural graphite and a 10 wt % mixture of polyvinylidene fluoride (PVdF) and N-methyl pyrrolidone (NMP) were mixed with water to prepare a slurry for a negative mass.

Comparative Example 2

A lithium secondary coin-cell was prepared in the same manner as in Example 1, except that 96 wt % of natural graphite, 3 wt % of styrene-butadiene rubber (SBR), and 1 wt % of CMC were mixed with water to prepare a slurry for a negative mass.

Comparative Example 3

A lithium secondary coin-cell was prepared in the same manner as in Example 1, except that 96 wt % of artificial graphite, 3 wt % of styrene-butadiene rubber and 1 wt % of CMC were mixed with water to prepare a slurry for a negative mass.

Example 7

A lithium secondary coin-cell was prepared in the same manner as in Example 1, except that 96 wt % of artificial graphite, 2 wt % of polyvinyl alcohol and 2 wt % of PASS were mixed with water to prepare a slurry for a negative mass.

Comparative Example 4

A lithium secondary coin-cell was prepared in the same manner as in Example 1, except that 90 wt % of artificial graphite and a 10 wt % mixture of PVdF and NMP were mixed with water to prepare a slurry for a negative mass.

Comparative Example 5

A lithium secondary coin-cell was prepared in the same manner as in Example 1, except that 97 wt % of natural graphite and 3 wt % of PASS were prepared with water to prepare a slurry for a negative mass.

Comparative Example 6

97 wt % of natural graphite and 3 wt % of PVA were prepared with water to prepare a slurry for a negative mass. It was pre-dried at 60° C. for 30 minutes, and it was further dried under vacuum at 120° C. for 24 hours, but the resultant electrode material was easily peeled off from the copper foil.

The lithium secondary coin-cells of Examples 1 to 7 and Comparative Examples 1 to 6 were charged and discharged for testing cycle life characteristics. Each lithium secondary coin-cell was charged at 0.2 C to 0 V (Li/Li$^+$) and they were discharged at 0.2 C to 1.5 V (Li/Li$^+$) four times. They were charged at 1 C to 0 V (Li/Li$^+$), and they were discharged at 0.2 C to 1.5 V (Li/Li$^+$) 50 times. Further, all batteries were charged at a constant current/constant voltage, and the final current of constant voltage was 0.01 C.

The discharge capacity and cycle life characteristics of the lithium secondary coin-cells were measured at 1 cycle (0.2 C). Also, the batteries were measured for discharge capacity at 5 cycles, 54 cycles, and 1 cycle to calculate the discharge capacity ratios ($54^{th}/1^{st}$) of a discharge capacity at 54 cycles compared to a discharge capacity at 1 cycle (1 C). The results are listed in Table 1.

amount of PVA and PASS (1 wt % each) in Example 2 was too little to obtain a sufficient binding strength, and that the amount of PVA and PASS (3 wt % each) in Example 3 was excessive to thus increase battery impedance due to a thick layer formed on an active material by the PASS.

In Examples 4 and 5, the lithium secondary coin-cells were prepared at a higher pre-drying temperature compared to that of the lithium secondary coin-cell in Example 1. The discharge capacities of the lithium secondary coin-cells according to Examples 4 and 5 are higher than that of the lithium secondary coin-cells according to Example 1, and in particular, that of the lithium secondary coin-cell according to Example 6 is higher than the ideal discharge capacity of natural graphite.

TABLE 1

| | Active material | Binder | Pre-drying temperature (° C.) | 1 cycle (at 0.2 C) Discharge Capacity (mAh/g) | Charge And discharge | Discharge Capacity (mAh/g) at 5 cycles (1 C) | Capacity retention ratio (%) ($54^{th}/1^{st}$) |
|---|---|---|---|---|---|---|---|
| Example 1 | Natural Graphite | 2 wt % PVA + 2 wt % PASS | 60 | 368 | 92.3 | 360 | 82.5 |
| Example 2 | Natural Graphite | 1 wt % PVA + +1 wt % PASS | 60 | 365 | 90.9 | 355 | 75.6 |
| Example 3 | Natural Graphite | 3 wt % PVA + 3 wt % PASS | 60 | 361 | 90.3 | 330 | 62.3 |
| Example 4 | Natural Graphite | 2 wt % PVA + 2 wt % PASS | 150 | 370 | 91.7 | 359 | 79.8 |
| Example 5 | Natural Graphite | 2 wt % PVA + 2 wt % PASS | 180 | 377 | 88.8 | 351 | 71.9 |
| Example 6 | Natural Graphite | 2 wt % CMC + 2 wt % PASS | 60 | 365 | 91.3 | 358 | 80.8 |
| Example 7 | Artificial Graphite | 2 wt % PVA + 2 wt % PASS | 60 | 345 | 91.8 | 337 | 80.7 |
| Comp. Example 1 | Natural Graphite | 10 wt % PVdF | 60 | 360 | 90.1 | 345 | 66.7 |
| Comp. Example 2 | Natural Graphite | 3 wt % SBR + 1 wt % CMC | 60 | 364 | 92.0 | 340 | 46.9 |
| Comp. Example 3 | Artificial Graphite | 3 wt % SBR + 1 wt % CMC | 60 | 318 | 85.1 | 273 | 35.3 |
| Comp. Example 4 | Artificial Graphite | 10 wt % PVdF | 60 | 340 | 92.3 | 330 | 75.8 |

As shown in Table 1, the discharge capacity and cycle life characteristics of a lithium secondary coin-cell using natural graphite and a binder comprising 2 wt % each of PVA and PASS according to Example 1 were higher than those of Comparative Examples 1 and 2. Also, the capacity retention of a lithium secondary coin-cell according to Example 1 shows a substantially high value.

The lithium secondary coin-cells of Examples 2 and 3 comprise a binder comprising PVA and PASS, but the amounts thereof are different. The discharge capacity and cycle life characteristics of the lithium secondary coin-cells according to Examples 2 and 3 were quite similar to those of lithium secondary coin-cells according to Comparative Examples 1 and 2, but the capacity retention of the lithium secondary coin-cells according to Example 2 and 3 were not as high as that of lithium secondary coin-cells according to Example 1. It is believed that the reason for this is that the However, the cycle life characteristics of the lithium secondary coin-cell according to Example 4 are similar to those of the lithium secondary coin-cells according to Comparative Examples 1 and 2, and those of the lithium secondary coin-cell according to Example 5 are lower than those of the Comparative Examples. It is believed that the reason for this is that the total impedance of electrodes increases due to decomposition of PVA and an increase in electrical resistance of PASS when the drying temperature is greater than 150° C.

In Example 6, the lithium secondary coin-cell was prepared as in Example 1, except CMC was used for a binder instead of PVA. Its discharge capacity, cycle life characteristics, and capacity retention are similar to those of Example 1.

In Example 7 and Comparative Examples 3 and 4, artificial graphite was used for an active material. The artificial graphite has a smaller specific surface area and a worse wettability than natural graphite. Therefore, an adhesive such as SBR may not be used for a binder because of its insufficient binding strength to the artificial graphite. As shown in Table 1, the test results of the lithium secondary coin-cell according to Comparative Example 3 show that its discharge capacity, cycle life characteristics, and capacity retention are lower than those of the lithium secondary coin-cell of Comparative Example 4 using PVdF as a binder.

In Example 7, the discharge capacity and cycle life characteristics of the lithium secondary coin-cell in which water-soluble polymers such as PVA and PASS were used for a binder are similar to those of the lithium secondary coin-cell according to Comparative Example 4, and the coin-cell of Example 7 has a higher capacity retention than that of Comparative Example 4. It is believed that the reason for this is that the electrode of Example 7 has a high binding strength due to its forming a PASS-coating layer on an active material, and its improved wettability, and that the active material is well-coated with a binder.

The results set forth in Table 1 show improvements in battery characteristics such as discharge capacity, cycle life characteristics, and capacity retention when a water-soluble aniline-based polymer and a water-soluble polymer were used together for a binder, but the battery characteristics did not improve when they were individually used for a binder.

A water-soluble aniline-based polymer, a water-soluble polymer, and latex were used for a binder to fabricate lithium secondary coin-cells.

Example 8

96 wt % of natural graphite, 2 wt % of PVA, 1 wt % of PASS, and 1 wt % of SBR were mixed with water, and stirred for 15 minutes to prepare a slurry paste for a negative mass, and the slurry was coated on a copper foil. It was pre-dried at 60° C. for 30 minutes, and it was further dried under vacuum at 120° C. for 24 hours, so that the material was laminated with a thickness of 100 μm on the copper foil.

The laminated copper foil was cut in a coin-shape with a diameter of 13 mm, and it was pressed with a pressure of 1 ton/cm² to prepare a negative electrode. The negative electrode was used for a working electrode, and lithium metal was used for a counter electrode. Porous polypropylene film was used for a separator, and it was interposed between the working electrode and the counter electrode. The electrolyte included 1 mol/l $LiPF_6$ in a mixture of dimethyl carbonate (DMC), diethyl carbonate (DEC), and ethylene carbonate (EC). The working and counter electrodes and the separator were put into a coin-type case with an electrolyte to fabricate a lithium secondary coin-cell.

Example 9

A lithium secondary coin-cell was prepared in the same manner as in Example 8, except that 95 wt % of natural graphite, 2 wt % of PVA, 1 wt % of PASS, and 2 wt % of SBR were mixed with water to prepare a slurry for a negative mass.

Example 10

A lithium secondary coin-cell was prepared in the same manner as in Example 8, except that 94 wt % of natural graphite, 2 wt % of PVA, 1 wt % of PASS, and 3 wt % of SBR were mixed with water to prepare a slurry for a negative mass.

Example 11

A lithium secondary coin-cell was prepared in the same manner as in Example 8, except that 96 wt % of natural graphite, 2 wt % of PVA, 1 wt % of PASS, and 1 wt % of SBR were mixed with water to prepare a slurry for a negative mass.

Comparative Example 7

A lithium secondary coin-cell was prepared in the same manner as in Example 8, except that 90 wt % of natural graphite and a 10 wt % mixture of polyvinylidene fluoride (PVdF) and N-methyl pyrrolidone were mixed with water to prepare a slurry for a negative mass.

Comparative Example 8

A lithium secondary coin-cell was prepared in the same manner as in Example 8, except that 96 wt % of natural graphite, 2 wt % of PVA, and 2 wt % of PASS were mixed with water to prepare a slurry for a negative mass.

Comparative Example 9

A lithium secondary coin-cell was prepared in the same manner as in Example 8, except that 96 wt % of artificial graphite, 3 wt % of SBR, and 1 wt % of CMC were mixed with water to prepare a slurry for a negative mass.

Comparative Example 10

A lithium secondary coin-cell was prepared in the same manner as in Example 8, except that 90 wt % of artificial graphite and a 10 wt % mixture of PVdF and NMP were mixed with water to prepare a slurry for a negative mass.

Comparative Example 11

A lithium secondary coin-cell was prepared in the same manner as in Example 8, except that 96 wt % of artificial graphite, 2 wt % of PVA, and 2 wt % of PASS were mixed with water to prepare a slurry for a negative mass.

Test for Cycle Life Characteristics

The lithium secondary coin-cells of Examples 8 to 11 and Comparative Examples 7 to 11 were charged and discharged for testing cycle life characteristics. Each lithium secondary coin-cell was charged at 0.2 C to 0 V (Li/Li$^+$) and they were discharged at 0.2 C to 1.5 V (Li/Li$^+$). After 4 charge/discharge cycles, they were charged at 1 C to 0 V (Li/Li$^+$), and they were discharged at 0.2 C to 1.5 V (Li/Li$^+$) for 50 charge/discharge cycles. Further, all batteries were charged at a constant current/constant voltage, the final current of constant voltage being 0.01C.

The discharge capacity and cycle life characteristics of the lithium secondary coin-cells were measured at 1 cycle (0.2 C). Also, each battery was measured for discharge capacity at 5 cycles, 54 cycles, and 1 cycle to calculate the discharge capacity ratio ($54^{th}/1^{st}$) of a discharge capacity at 54 cycles compared to a discharge capacity at 1 cycle (1 C). The results are listed in Table 2.

TABLE 2

| | Active material | Binder | At 1 cycle (0.2 C) Discharge Capacity (mAh/g) | At 1 cycle (0.2 C) Cycle life characteristics | Discharge capacity (mAh/g) at 5 cycles (1 C) | Capacity retention (%) (54th/1st) |
|---|---|---|---|---|---|---|
| Example 8 | Natural Graphite | 2 wt % PVA + 2 wt % PASS + 1 wt % SBR | 369 | 94 | 361 | 85.8 |
| Example 9 | Natural graphite | 2 wt % PVA + 1 wt % PASS + 2 wt % SBR | 363 | 93 | 352 | 81.9 |
| Example 10 | Natural Graphite | 2 wt % PVA + 1 wt % PASS + 3 wt % SBR | 362 | 91.5 | 347 | 72.4 |
| Example 11 | Artificial Graphite | 2 wt % PVA + 1 wt % PASS + 1 wt % SBR | 342 | 92.8 | 334 | 82.6 |
| Comp. Example 7 | Natural Graphite | 10 wt % PVdF | 360 | 90.1 | 345 | 66.7 |
| Comp. Example 8 | Natural Graphite | 2 wt % PVA + 2 wt % PASS | 368 | 92.3 | 360 | 82.5 |
| Comp. Example 9 | Artifical Graphite | 3 wt % SBR + 1 wt % CMC | 318 | 85.1 | 273 | 35.3 |
| Comp. Example 10 | Artificial Graphite | 10 wt % PVdF | 340 | 92.3 | 330 | 75.8 |
| Comp. Example 11 | Artificial Graphite | 2 wt % PVA + 2 wt % PASS | 345 | 91.8 | 337 | 80.7 |

As shown in Table 2, the discharge capacity and cycle life characteristics of the lithium secondary coin-cell using natural graphite and a binder comprising 2 wt % of PVA, 1 wt % of PASS, and 1 wt % of SBR according to Example 8 were higher than those of Comparative Example 7 using a binder comprising polyvinylidene fluoride. Also, the capacity retention of the lithium secondary coin-cell according to Example 8 was appreciably higher.

The battery characteristics of the lithium secondary coin-cell of Example 8 were much higher than those of the lithium secondary coin-cell of Comparative Example 8, which used 2 wt % each of PVA and PASS.

In Examples 9 and 10, PVA, PASS, and SBR were used for a binder, but with different amounts of SBR. The battery characteristics of Example 10 were poorer than those of Example 9, and this is believed to be because the conductivity of PASS decreases as the amount of SBR increases.

Generally, artificial graphite has a smaller specific surface area and a worse wettability than does natural graphite. Therefore, when the artificial graphite is used for an active material with only an adhesive binder comprising SBR, the binding strength between the binder and the active material may not be sufficiently strong. The results of Comparative Examples 9 using SBR and CMC shows deterioration of battery characteristics compared to those of Comparative Example 10 using PVdF.

A coin-cell of Example 11 using PVA, PASS, and SBR has discharge capacity and charge-discharge characteristics similar to those of Comparative Example 10, and the capacity retention of Example 11 was superior to that of Comparative Example 10.

It is believed that when an active material is coated with PASS, it gives the battery high binding strength and wettability, and the binder is well-mixed with the active material.

The battery characteristics of the coin-cell according to Example 11 are improved compared to those of Comparative Example 11 using 2 wt % of PVA and 2 wt % of PASS. It is believed that the binders of the Examples comprising SBR, which provides the binders with flexibility, and active materials could not be separated from the electrode during charging and discharging, even though the active material expanded and contracted during charging and discharging.

As in the aforementioned, according to the electrode material of the present invention and a method for its preparation, a battery can be fabricated with a strong binding strength. For example, the binder of the present invention shows sufficient binding strength to an active material, though half the amount of binder according to the present invention may be used compared to the amount of binder according to the prior art. The specific discharge capacity of the active material increases as the electrode composition of binder decreases, thereby improving the battery characteristics.

In addition, the binder of the present invention has higher flexibility, and the expansion and contraction of the binder according to expansion and contraction of active materials during charging and discharging can be controlled. The preferred binder comprises conductive aniline-based polymers, and the conductive aniline-based polymers help intercalation and deintercalation of lithium ions. Therefore, when a battery comprising the binder is charged or discharged at high rates, the cycle life characteristics of the battery may not deteriorate. Since the binder is water-soluble, it is environmentally friendly, and the solvent does not need to be recycled. Therefore, a battery comprising the electrode comprising the binder has greater energy density and improved cycle life characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrode material comprising:
   a binder having a water-soluble conductive polymer selected from the group consisting of polyaniline sulfonic acid and polyaniline carbonic acid, and a water-soluble polymer, and
   an active material.

2. The electrode material according to claim 1, wherein the content of water-soluble conductive polymer ranges from about 0.1 to about 10 wt % based on the total weight of the electrode material.

3. The electrode material according to claim 1, wherein the content of water-soluble conductive polymer ranges from about 0.3 to about 2 wt %, based on the total weight of the electrode material.

4. The electrode material according to claim 1, wherein the water-soluble polymer is selected from the group consisting of polyvinyl alcohol, carboxymethyl cellulose, polyvinylpyrrolidone polyacrylic acid, polyrnethacrylic acid, polyethylene oxide, polyacrylamide, poly-N-isopropylacrylamide, poly-N,N-dimethylacrylamide, polyethylene imine, polyoxyethylene, poly(2-methoxyethoxyethylene), poly(3-morphinylethylene), polyvinylsulfonic acid, polyvinylidene fluoride, and amylose.

5. The electrode material according to claim 1, wherein the content of water-soluble polymer ranges from about 0.1 to about 10 wt % based on the total weight of the electrode material.

6. The electrode material according to claim 1, wherein the content of water-soluble polymer ranges from about 0.3 to about 3 wt % based on the total weight of the electrode material.

7. An electrode material comprising:
   a binder comprising a water-soluble conductive polymer selected from the group consisting of polyaniline sulfonic acid and polyaniline carbonic acid, latex, and a water-soluble polymer, and
   one or more active materials.

8. The electrode material according to claim 7, wherein the content of latex ranges from about 0.1 to about 10 wt % based on the total weight of the electrode material.

9. A method for preparing an electrode material comprising:
   mixing a binder comprising a water-soluble conductive polymer selected from the group consisting of polyaniline sulfonic acid and polyaniline carbonic acid, and a water-soluble polymer with water; and
   drying the mixture.

10. A method for preparing an electrode material comprising:
    mixing a binder comprising a water-soluble conductive polymer selected from the group consisting of polyaniline sulfonic acid and polyaniline carbonic acid, latex, and a water-soluble polymer with water; and
    drying the mixture.

11. The method for preparing an electrode material according to claim 10, wherein the content of latex ranges from about 0.1 to about 10 wt % based on the total weight of the electrode material.

12. An electrode comprising the electrode material of claim 1.

13. A battery comprising the electrode of claim 12.

* * * * *